United States Patent
Abdel-Baqi et al.

(10) Patent No.: US 8,606,451 B2
(45) Date of Patent: Dec. 10, 2013

(54) ENERGY SYSTEM FOR HEAVY EQUIPMENT

(75) Inventors: Omar Abdel-Baqi, Oak Creek, WI (US); Adel Nasiri, Milwaukee, WI (US); Peter Miller, Brookfield, WI (US); Joe Helfrich, Milwaukee, WI (US)

(73) Assignee: Caterpillar Global Mining LLC, South Milwaukee, WI (US)

(*) Notice: Subject to any disclaimer, the term of this patent is extended or adjusted under 35 U.S.C. 154(b) by 212 days.

(21) Appl. No.: 13/246,425

(22) Filed: Sep. 27, 2011

(65) Prior Publication Data

US 2012/0086220 A1    Apr. 12, 2012

Related U.S. Application Data

(63) Continuation-in-part of application No. 12/899,375, filed on Oct. 6, 2010.

(51) Int. Cl.
*B60W 10/24* (2006.01)
*E02F 9/20* (2006.01)

(52) U.S. Cl.
USPC .............................................. 701/22; 701/50

(58) Field of Classification Search
None
See application file for complete search history.

(56) References Cited

U.S. PATENT DOCUMENTS

| | | |
|---|---|---|
| 3,425,574 A | 2/1969 | Willgrubs et al. |
| 3,891,354 A | 6/1975 | Bosch |
| 4,050,478 A | 9/1977 | Virtue et al. |
| 4,230,022 A | 10/1980 | Bianchetta et al. |
| 4,533,900 A | 8/1985 | Muhlberger et al. |
| 4,606,313 A | 8/1986 | Izumi et al. |
| 4,763,473 A | 8/1988 | Ziplies et al. |
| 4,875,337 A | 10/1989 | Sugiyama et al. |
| 5,167,121 A | 12/1992 | Sepehri et al. |
| 5,295,353 A | 3/1994 | Ikari |
| 5,303,551 A | 4/1994 | Lee |

(Continued)

FOREIGN PATENT DOCUMENTS

| | | |
|---|---|---|
| DE | 22 51 904 | 4/1974 |
| DE | 23 31 617 | 1/1975 |

(Continued)

OTHER PUBLICATIONS

International Search Report and Written Opinion for International Application No. PCT/US2011/052950, mail date Apr. 16, 2012, 7 pages.

(Continued)

*Primary Examiner* — Michael J Zanelli
(74) *Attorney, Agent, or Firm* — Foley & Lardner LLP

(57) ABSTRACT

An energy system for heavy equipment having an actuator for operating a tool includes a bus, an engine, a generator, an energy storage device, and a controller. The bus is for providing electricity to the actuator as a function of operation of the tool. The engine is for providing a power output and the generator is coupled to the engine and configured to provide electricity to the bus. The energy storage device is configured to receive electricity from the bus for storage of energy, and is further configured to provide electricity to the bus to supplement the electricity provided by the generator. The controller is configured to change the power output of the engine as a function of electrical demand on the bus. In response to a change in the electrical demand, the controller is configured to change the power output of the engine at a rate that is less than a maximum capability of the engine.

27 Claims, 12 Drawing Sheets

(56) References Cited

U.S. PATENT DOCUMENTS

| | | |
|---|---|---|
| 5,563,351 A | 10/1996 | Miller |
| 5,673,558 A | 10/1997 | Sugiyama et al. |
| 5,722,190 A | 3/1998 | Arnold |
| 5,852,934 A | 12/1998 | Chung et al. |
| 5,890,303 A | 4/1999 | Ishikawa et al. |
| 6,005,360 A | 12/1999 | Pace |
| 6,087,945 A | 7/2000 | Yasuda |
| 6,141,629 A | 10/2000 | Yamamoto et al. |
| 6,148,548 A | 11/2000 | Tohji |
| 6,164,069 A | 12/2000 | Takahashi et al. |
| 6,164,388 A | 12/2000 | Martunovich et al. |
| 6,175,217 B1 | 1/2001 | Da Ponte et al. |
| 6,199,307 B1 | 3/2001 | Kagoshima et al. |
| 6,282,891 B1 | 9/2001 | Rockwood |
| 6,323,608 B1 | 11/2001 | Ozawa |
| 6,326,763 B1 | 12/2001 | King et al. |
| 6,339,737 B1 | 1/2002 | Yoshimura et al. |
| 6,422,001 B1 | 7/2002 | Sherman et al. |
| 6,460,332 B1 | 10/2002 | Maruta et al. |
| 6,584,769 B1 | 7/2003 | Bruun |
| 6,591,697 B2 | 7/2003 | Henyan |
| 6,591,758 B2 | 7/2003 | Kumar |
| 6,612,246 B2 | 9/2003 | Kumar |
| 6,635,973 B1 | 10/2003 | Kagoshima et al. |
| 6,650,091 B1 | 11/2003 | Shiue et al. |
| 6,678,972 B2 | 1/2004 | Naruse et al. |
| 6,683,389 B2 | 1/2004 | Geis |
| 6,708,787 B2 | 3/2004 | Naruse et al. |
| 6,725,581 B2 | 4/2004 | Naruse et al. |
| 6,789,335 B1 | 9/2004 | Kinugawa et al. |
| 6,799,424 B2 | 10/2004 | Ioku et al. |
| 6,810,362 B2 | 10/2004 | Adachi et al. |
| 6,820,356 B2 | 11/2004 | Naruse et al. |
| 6,832,175 B2 | 12/2004 | Adachi et al. |
| 6,864,663 B2 | 3/2005 | Komiyama et al. |
| 6,870,139 B2 | 3/2005 | Petrenko |
| 6,876,098 B1 | 4/2005 | Gray, Jr. |
| 6,907,384 B2 | 6/2005 | Adachi et al. |
| 6,922,990 B2 | 8/2005 | Naruse et al. |
| 6,962,050 B2 | 11/2005 | Hiraki et al. |
| 7,069,674 B2 | 7/2006 | Arii |
| 7,078,825 B2 | 7/2006 | Ebrahim et al. |
| 7,078,877 B2 | 7/2006 | Salasoo et al. |
| 7,082,758 B2 | 8/2006 | Kageyama et al. |
| 7,096,985 B2 | 8/2006 | Charaudeau et al. |
| 7,146,808 B2 | 12/2006 | Devier et al. |
| 7,174,826 B2 | 2/2007 | Kerrigan et al. |
| 7,190,133 B2 | 3/2007 | King et al. |
| 7,251,934 B2 | 8/2007 | Lech et al. |
| 7,252,165 B1 | 8/2007 | Gruenwald et al. |
| 7,258,183 B2 | 8/2007 | Leonardi et al. |
| 7,275,369 B2 | 10/2007 | Kim |
| 7,298,102 B2 | 11/2007 | Sopko et al. |
| 7,356,991 B2 | 4/2008 | Kim et al. |
| 7,378,808 B2 | 5/2008 | Kuras et al. |
| 7,386,978 B2 | 6/2008 | Ivantysynova et al. |
| 7,398,012 B2 | 7/2008 | Koellner |
| 7,401,464 B2 | 7/2008 | Yoshino |
| 7,430,967 B2 | 10/2008 | Kumar |
| 7,439,631 B2 | 10/2008 | Endou |
| 7,444,809 B2 | 11/2008 | Smith et al. |
| 7,444,944 B2 | 11/2008 | Kumar et al. |
| 7,448,328 B2 | 11/2008 | Kumar |
| 7,456,509 B2 | 11/2008 | Gray, Jr. |
| 7,479,757 B2 | 1/2009 | Ahmad |
| 7,518,254 B2 | 4/2009 | Donnelly et al. |
| 7,531,916 B2 | 5/2009 | Franklin et al. |
| 7,532,960 B2 | 5/2009 | Kumar |
| 7,533,527 B2 | 5/2009 | Naruse |
| 7,560,904 B2 | 7/2009 | Alvarez-Troncoso |
| 7,571,683 B2 | 8/2009 | Kumar |
| 7,628,236 B1 | 12/2009 | Brown |
| 7,730,981 B2 | 6/2010 | McCabe et al. |
| 7,748,279 B2 | 7/2010 | Budde et al. |
| 8,022,663 B2 | 9/2011 | Davis et al. |
| 2002/0104239 A1 | 8/2002 | Naruse et al. |
| 2003/0089557 A1 | 5/2003 | Eilinger |
| 2004/0021441 A1 | 2/2004 | Komiyama et al. |
| 2004/0073468 A1 | 4/2004 | Vyas et al. |
| 2005/0061561 A1 | 3/2005 | Leonardi et al. |
| 2005/0139399 A1 | 6/2005 | Gopal |
| 2005/0246082 A1 | 11/2005 | Miki et al. |
| 2005/0263331 A1 | 12/2005 | Sopko et al. |
| 2006/0061922 A1 | 3/2006 | Mihai et al. |
| 2007/0080236 A1 | 4/2007 | Betz et al. |
| 2007/0166168 A1 | 7/2007 | Vigholm et al. |
| 2007/0234718 A1 | 10/2007 | Vigholm |
| 2008/0157592 A1* | 7/2008 | Bax et al. ............... 307/10.1 |
| 2008/0290842 A1 | 11/2008 | Davis et al. |
| 2008/0295504 A1 | 12/2008 | Vigholm et al. |
| 2009/0056324 A1 | 3/2009 | Itakura et al. |
| 2009/0090102 A1 | 4/2009 | Busse et al. |
| 2009/0159143 A1 | 6/2009 | Nishikawa et al. |
| 2010/0097029 A1 | 4/2010 | McCabe |
| 2010/0156180 A1* | 6/2010 | Nishiyama ............... 307/46 |
| 2010/0289443 A1 | 11/2010 | Mazumdar et al. |

FOREIGN PATENT DOCUMENTS

| | | |
|---|---|---|
| DE | 36 11 553 | 7/1987 |
| DE | 41 02 621 | 8/1992 |
| DE | 699 20 452 | 11/2005 |
| DE | 102005 17 127 | 11/2006 |
| EP | 1782991 | 5/2007 |
| EP | 1914102 | 4/2008 |
| EP | 2228491 | 9/2010 |
| JP | 2000-170687 | 6/2000 |
| JP | 2003-013866 | 1/2003 |
| JP | 2004-100847 | 4/2004 |
| JP | 2008-057687 | 3/2008 |
| JP | 2009-167618 | 7/2009 |
| KR | 10199641737 | 12/1996 |
| KR | 10300305 | 6/2001 |
| WO | WO 90/10850 | 9/1990 |
| WO | WO 2004/074686 | 9/2004 |
| WO | WO 2010/058768 | 5/2010 |

OTHER PUBLICATIONS

International Search Report and Written Opinion regarding International Application No. PCT/US2011/057491, mail date May 18, 2012, 9 pages.

International Search Report and Written Opinion for International Application No. PCT/EP2007/003582, mail date Jan. 30, 2008, 23 pages.

International Search Report and Written Opinion for International Application No. PCT/US2011/052966, mail date Apr. 10, 2012, 9 pages.

Office Action for U.S. Appl. No. 12/899,375, mail date Feb. 19, 2013, 15 pages.

* cited by examiner ated with the power shovel of FIG. 1.
ENERGY SYSTEM FOR HEAVY EQUIPMENT

CROSS-REFERENCE TO RELATED PATENT APPLICATIONS

This is a continuation-in-part of application Ser. No. 12/899,375, filed Oct. 6, 2010, which is incorporated herein by reference in its entirety.

BACKGROUND

The present disclosure relates generally to the field of energy management and storage systems. More specifically the present disclosure relates to energy storage systems for operation with heavy equipment for mining, excavating, and construction.

Heavy equipment, such as power shovels and excavators, may include a deck or other platform that rotates above tracks, wheels, pontoons, etc. Extending from the deck, the heavy equipment may further include a boom for an articulated arm or crane designed to operate a bucket, a breaker, a hook, or another form of work implement. Accordingly, such heavy equipment typically includes one or more actuators designed to move the tracks, rotate the deck, and operate the articulated arm and work implement.

Some types of heavy equipment are designed to operate in substantially-repetitive work cycles. By way of example, a power shovel or excavator may typically operate in work cycles that include digging, swinging, dumping, and returning steps for operating a bucket to dig and load fragmented rock, earth, minerals, overburden, and the like for mining purposes. These steps are essentially repeated time and time again, with minor variations to adjust the height at which the bucket engages the ground. The heavy equipment may use hydraulic cylinders or other forms of actuators to perform the lifting, rotating, and lowering movements.

SUMMARY

One embodiment relates to an energy system for heavy equipment having an actuator for operating a tool. The energy system includes a bus, an engine, a generator, an energy storage device, and a controller. The bus is for providing electricity to the actuator as a function of operation of the tool. The engine is for providing a power output and the generator is coupled to the engine and configured to provide electricity to the bus. The energy storage device is configured to receive electricity from the bus for storage of energy, and is further configured to provide electricity to the bus to supplement the electricity provided by the generator. The controller is configured to change the power output of the engine as a function of electrical demand on the bus. In response to a change in the electrical demand, the controller is configured to change the power output of the engine at a rate that is less than a maximum capability of the engine.

Another embodiment relates to an energy system for heavy equipment having an actuator for operating a tool. The energy system includes a bus, an engine, a generator, an ultra-capacitor, and a controller. The bus is for providing electricity to the actuator as a function of operation of the tool. The engine is for providing a power output and the generator is coupled to the engine and configured to provide electricity to the bus. The ultra-capacitor is configured to receive electricity from the bus for storage of energy, and is further configured to provide electricity to the bus to supplement the electricity provided by the generator. The controller is configured to change the power output of the engine as a function of electrical demand on the bus. In response to a change in the electrical demand, the controller is configured to optimize the rate of change in power output of the engine with respect to fuel economy.

Yet another embodiment relates to a method of controlling an energy system for heavy equipment. The method includes providing electrical power to a bus from a generator driven by an engine for powering an actuator operating a tool of the heavy equipment. The method further includes providing electrical power to the bus from an energy storage device in response to an increased electrical demand on the bus. The method still further includes increasing the power output of the engine driving the generator at a rate less than a maximum capability of the engine, and correspondingly decreasing the power provided to the bus from the energy storage device.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
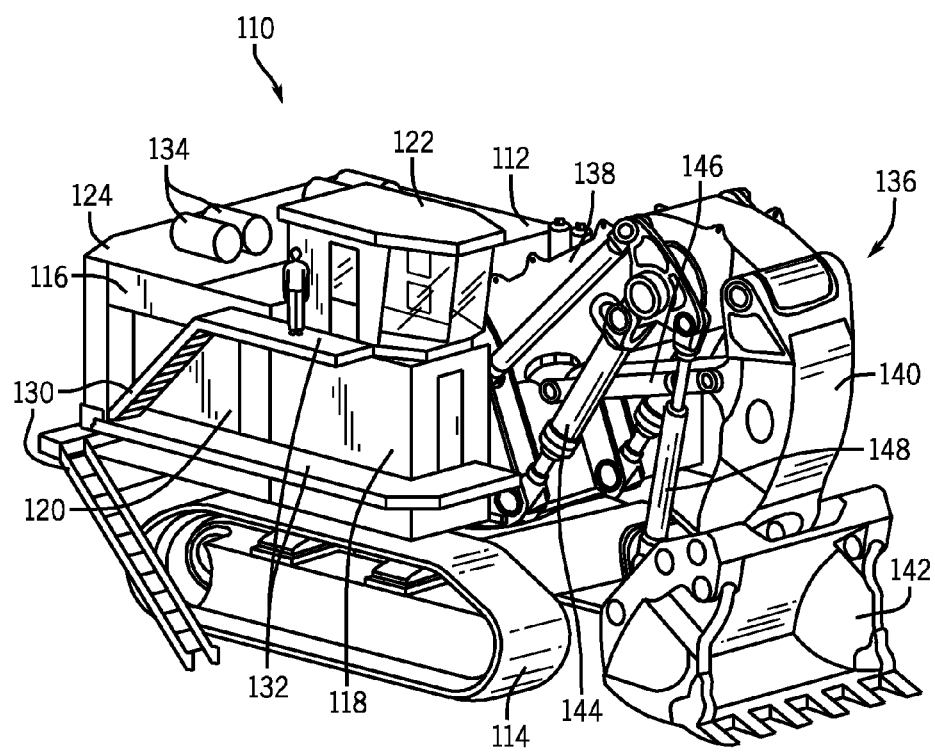
FIG. 1 is a perspective view of a power shovel according to an exemplary embodiment.

Referring to FIG. 1, heavy equipment in the form of a power shovel 110 includes a deck 112 moveable upon tracks 114. The deck 112 further includes a powerhouse 116, an electronic compartment 118 (e.g., "e-house"), a hydraulic system 120, an operator cab 122, energy storage components 124, and engine and hydraulic cooling systems 126, 128 (see FIG. 2). Various stairwells 130 and walkways 132 may be incorporated with the deck 112 for movement throughout the power shovel 110. Exhaust mufflers 134 are positioned on the deck 112 above the powerhouse 116 and to the rear of the operator cab 122. Extending from the deck 112, the power shovel 110 further includes a tool in the form of an articulated arm 136 including a boom 138 rotatably coupled to an arm 140 (e.g., stick), which is rotatably coupled to a bucket 142.

According to an exemplary embodiment, actuators (e.g., linear actuators) in the form of hydraulic cylinders, including a boom cylinder 144, an arm cylinder 146, and a curl cylinder 148, extend between the deck 112 and boom 138 to control movement of the boom 138 relative to the deck 112, between the boom 138 and the arm 140 to control movement of the arm 140 relative to the boom 138, and between the boom 138 and the bucket 142 to control movement of the bucket 142 relative to the arm 140. According to an exemplary embodiment, the hydraulic cylinders 144, 146, 148 are double-acting cylinders, configured to receive hydraulic fluid on both ends of the respective piston. Additional actuators (e.g., electric or hydraulic motors) may be used to propel the power shovel 110 via the tracks 114, and/or to rotate the deck 112 relative to the tracks 114.

Figure 2:
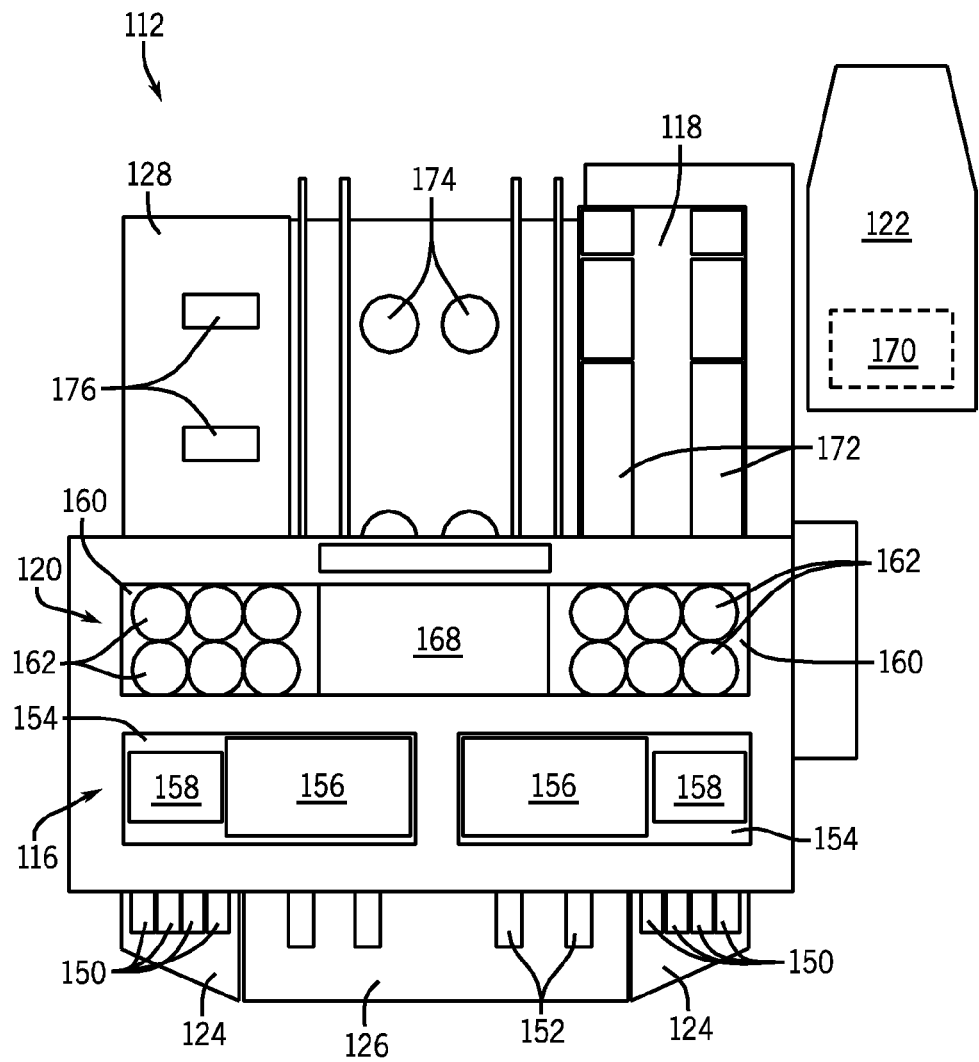
FIG. 2 is a plan view of the power shovel of FIG. 1.
Figure 3:
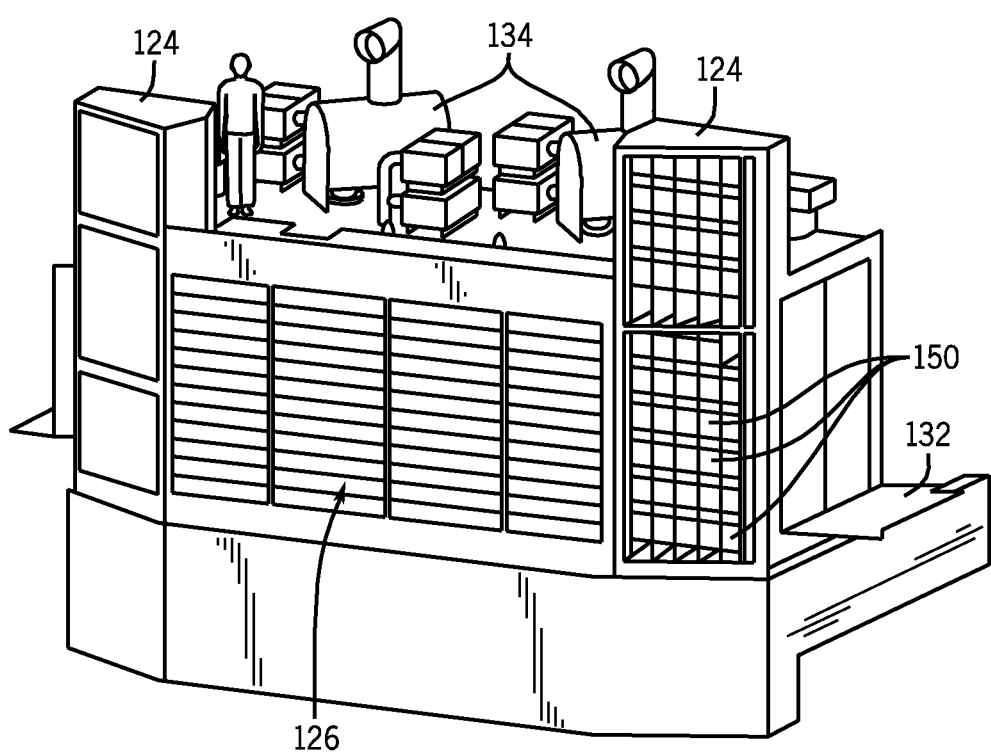
FIG. 3 is a perspective view of a portion of the deck of the power shovel of FIG. 1.

Referring to FIGS. 2-3, by way of example, the deck 112 includes two energy storage components 124 located proximate to the rear corners of the deck 112. In some embodiments the energy storage components 124 include banks of one or more ultra-capacitors 150. In other contemplated embodiments, other forms of energy storage components (e.g., secondary batteries) or other arrangements of energy storage components are used. Also in the rear of the deck 112, an engine cooler system 126, which may include one or more coolant fans 152 and/or blowers, is positioned between the energy storage components 124.

Figure 4:
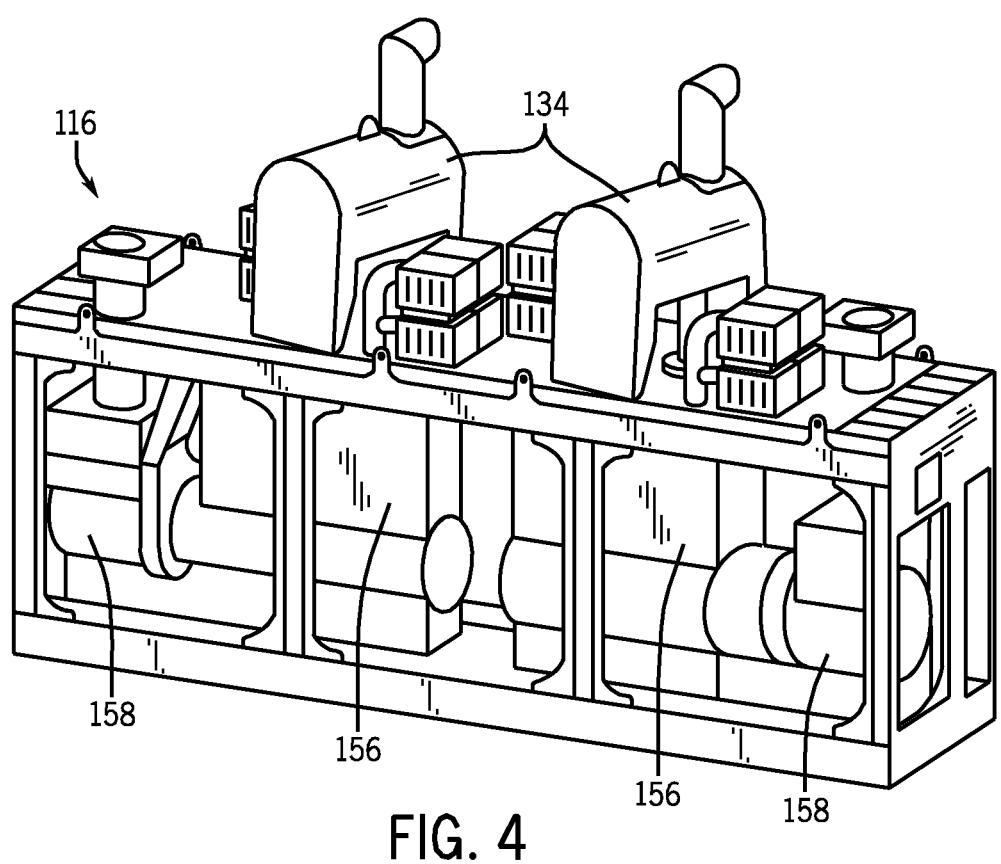
FIG. 4 is a perspective view of generators associated with the power shovel of FIG. 1.
Figure 7:
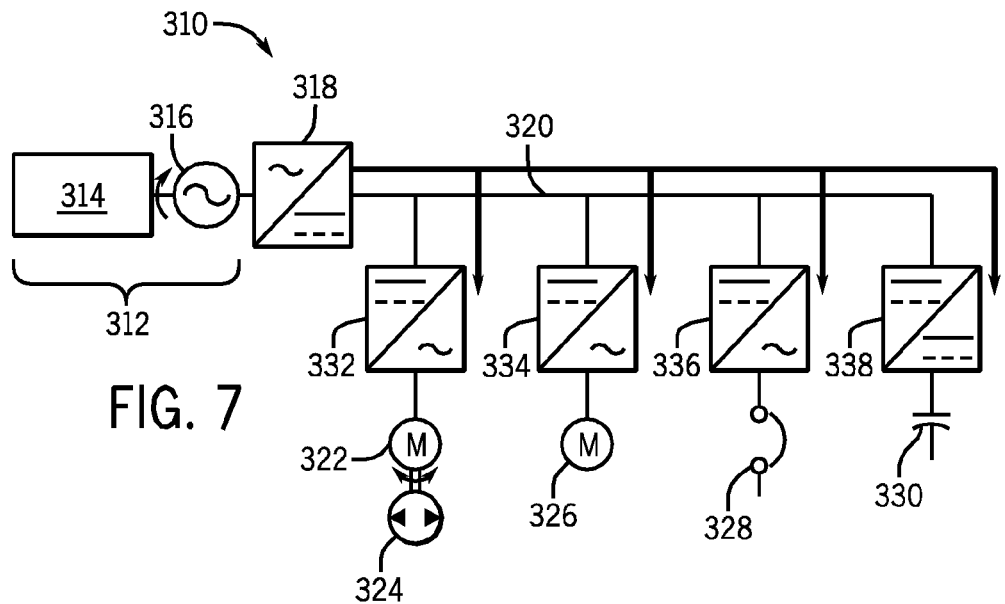
FIG. 7 is a schematic diagram of an energy management system in a first configuration according to an exemplary embodiment.

Referring to now FIGS. 2 and 4, according to such an embodiment, the deck 112 includes the powerhouse 116 in front of the electrical storage components 124. In some embodiments, the powerhouse 116 includes two diesel generator sets 154, each including an engine 156 driving an alternator 158 (e.g., generator). Rectifiers (see, e.g., rectifier 318 as shown in FIG. 7) may be used to convert alternating current provided by the diesel generator sets 154 to direct current for communication to working components of the power shovel 110 via a direct-current bus (see, e.g., bus 320 as shown in FIG. 7). In other embodiments, other numbers or types of generators are used, such as a single, gasoline-powered generator set. In still other embodiments, electrical power may be supplied over cables from a standalone power plant.

Figure 5:
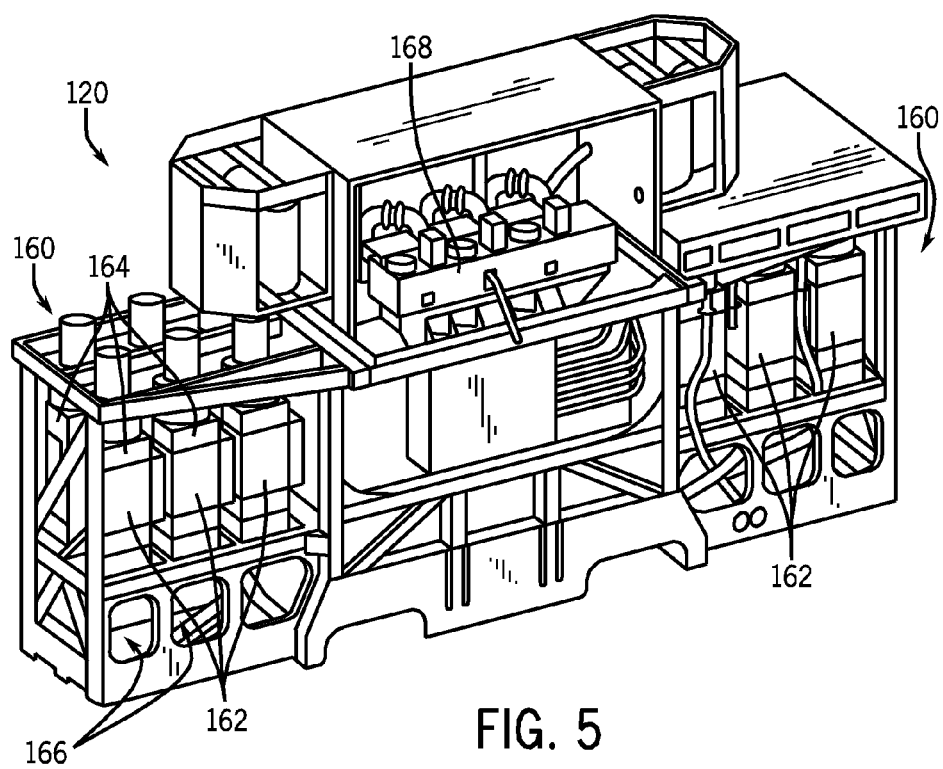
FIG. 5 is a perspective view of a hydraulic system associated with the power shovel of FIG. 1.

Referring to FIGS. 2 and 5, according to such an embodiment, the power shovel 110 includes the hydraulic system 120 for converting the electrical energy provided by the powerhouse 116 to energy of pressurized hydraulic fluid. The pressurized hydraulic fluid may then be used to drive hydraulic actuators, such as hydraulic cylinders 144, 146, 148 and hydraulic motors. In some exemplary embodiments, the hydraulic system 120 includes two groups 160 of six sets 162 of electric motors 164 coupled to hydraulic pumps 166. According to an exemplary embodiment, the pumps 166 are bi-directional, and may provide and receive hydraulic fluid under pressure in two directions.

For each set 162, the speed and direction of the hydraulic pump 166 is controlled by an electrical drive system 172 (e.g., one or more electrical drives and supporting structure, one or more inverters) stored in the electronic compartment 118 and coupled to the electrical bus (see also inverters 332, 334, 336 and bus 320 as shown in FIG. 7). The electrical drive system 172 selectively supplies power to control the speed, direction, and/or torque of the electric motor 164, which drives the hydraulic pump 166. During operation of the power shovel 110, fewer than all of the sets 162 may be operating at one time. In other embodiments, the hydraulic system may include other numbers or arrangements of electric motors and hydraulic pumps.

Still referring to FIGS. 2 and 5, in such an embodiment the sets 162 of hydraulic pumps 166 and electric motors 164 are coupled to a hydraulic valve manifold 168. According to an exemplary embodiment, the hydraulic valve manifold 168 is configured to direct the hydraulic fluid of one or more of the pump and motor sets 162 to and from working components of the power shovel 110. In some embodiments, the hydraulic valve manifold 168 is arranged as a matrix, where each pump and motor set 162 may be selectively coupled to each working component. By way of example, the hydraulic valve manifold 168 may couple the hydraulic fluid provided by two or more pumps to the same working component, such as one of the hydraulic cylinders 144, 146, 148. In some embodiments, the hydraulic valve manifold 168 is positioned between the two groups 160 of pump and motor sets 162.

In some embodiments the hydraulic system 120 is further configured for regeneration of energy associated with the hydraulic fluid. Surplus energy may be provided by the hydraulic fluid, such as when working components of the power shovel 110 are driven by gravity or momentum. Instead of or in combination with braking, the surplus energy of the hydraulic fluid may be conserved (e.g., reused, preserved, utilized). During such an operation, the hydraulic pumps 166 function as hydraulic motors, and are driven by the pressurized hydraulic fluid. The hydraulic pumps 166, in turn, drive the electric motors 164, which generate electricity and provide the electricity to the bus (see, e.g., bus 320 as shown in FIG. 7). If not then needed by other working components, the electricity may be stored via the energy storage components 124.

Referring again to FIG. 2, according to an exemplary embodiment the operator cab 122 includes a control computer 170 that uses logic to operate the power shovel 110 in response to and in conjunction with various inputs, including operator commands (e.g., joystick instructions to crowd bucket, raise boom, etc.), environmental conditions (e.g., sensed terrain slope), internal conditions (e.g., hydraulic fluid temperature, available power, etc.), and other factors. The control computer 170 operates the electrical drive system 172 positioned in the electronic compartment 118, which control the flow of electricity (e.g., amperage, voltage, frequency) from the generator sets 154 to the motor and pump sets 162 and other components, such as slew motors 174 and cooling fans 176 for the hydraulic system 120. In such embodiments, the slew motors 174 directly control rotation of the deck 112 relative to the tracks 114, such as during a swing movement of the power shovel 110.

Figure 6:
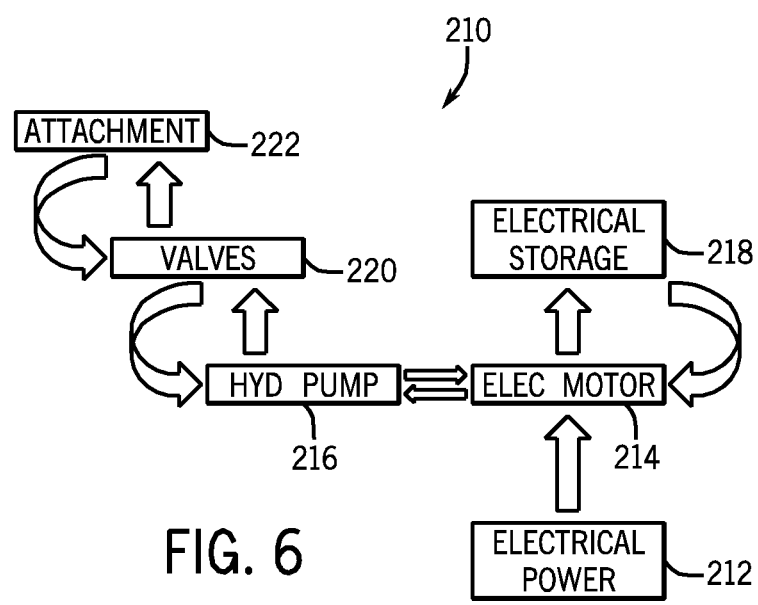
FIG. 6 is a flow chart of an energy management system according to an exemplary embodiment.

Referring now to FIG. 6, an energy management and storage system 210 includes a source 212 of electrical power, an electric motor 214, and a hydraulic pump 216. The electric motor 214 is further coupled to an electrical storage element 218. According to such an embodiment, the electric motor 214 is configured to receive power from both the electrical power source 212 and the electrical storage element 218. In addition, the electric motor 214 is configured to function as a generator and provide electricity to the electrical storage element 218.

During operation of the system 210, the electric motor 214 drives the hydraulic pump 216, which in turn pressurizes hydraulic fluid. The hydraulic fluid is controllably routed by way of valves 220 to one or more working components 222 (e.g., attachments) for operation of the working components 222. When the working components 222 are operating in a manner that uses braking resistance, the hydraulic fluid may be controllably routed through the valves 220 back to the hydraulic pump 216. In such cases, the hydraulic pump 216 may function as a hydraulic motor, driving the electric motor 214 to operate as a generator.

According to an exemplary embodiment, the source 212 of electrical power includes a generator set selected based upon output capacity. During operation of the system 210, the generator set is run at a substantially constant, optimal speed and power output where the speed or output is optimized for the particular generator set with respect to minimum fuel consumption per power output, maximum life of the generator set per power output, minimum maintenance or downtime of the system 210, or other such parameters or combinations of such parameters.

Figure 10:
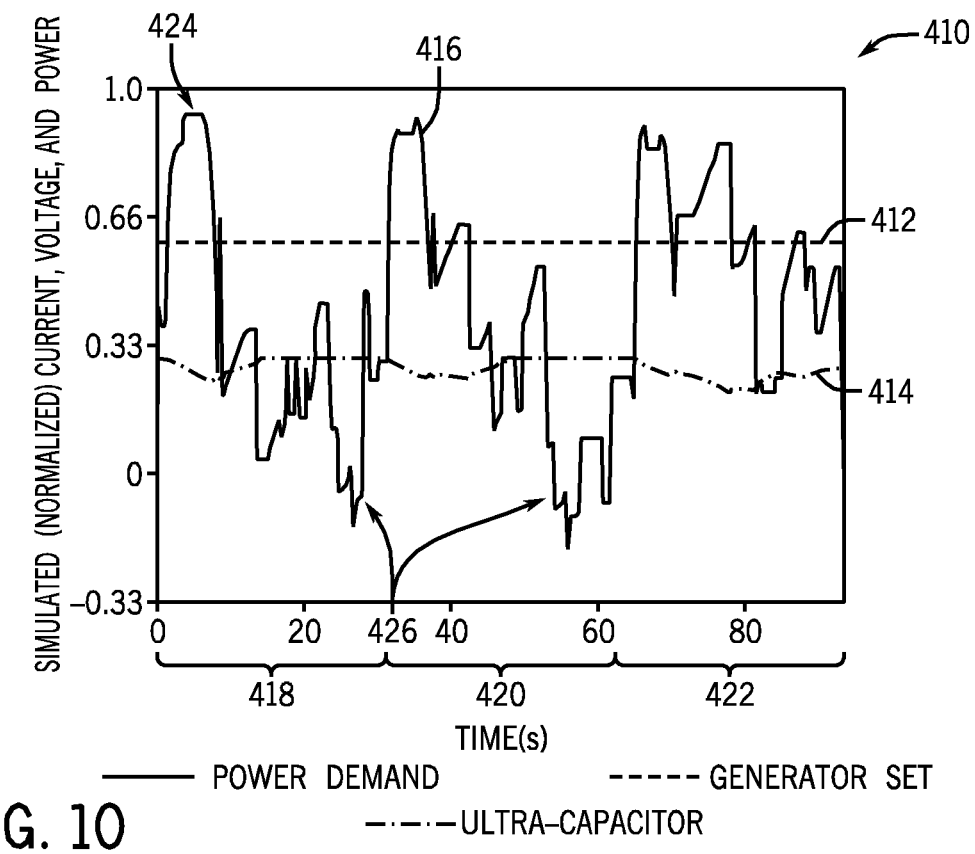
FIG. 10 is a graphical representation of prophetic data provided by a simulation according to an exemplary embodiment.

According to an exemplary embodiment, the generator set, running at the optimal speed, has an electrical output that is less than an expected power need for the system 210 during portions of a work cycle of the system 210. Additional power from the electrical storage element 218 supplements the power of the generator set, allowing the system 210 to meet momentary power demands, while the generator set to still continuously run at the optimal speed and/or power output. In some embodiments, the electrical storage element provides at least 20-percent of the power used by the system during a peak demand portion of the work cycle (compare power demand 416 with generator output 412 as shown in FIG. 10). During other portions of the work cycle, the generator set may produce surplus power, which may be delivered to the electrical storage element 218.

In some embodiments, the generator set of the source 212 is selected such that running at optimal speeds the generator set (or sets) provides the total energy used by the system 210 throughout each work cycle. The supplemental energy provided by the energy storage element 218 during the higher-demand portions of the work cycle is completely offset by the surplus energy provided by the source 212 during the lower-demand portions of the work cycle. Steady-state operation of the generator set at optimal running speeds may not occur during initial cycles of operation for a particular assignment, when the system 210 is moved to a new location, when the system 210 changes tasks, etc. During such times the generator set may be run at above or below optimal speeds.

In other embodiments, the generator set (or sets) is selected such that, at optimal running speeds of the generator set, the source 212 provides less than the total energy used by the system 210 throughout each work cycle. Instead, a portion of the energy required for each work cycle is regenerated from previous work cycles. During initial cycles, the generator set may be run above the optimal power until the capacitor is charged and/or until energy is available from regeneration.

Figure 8:
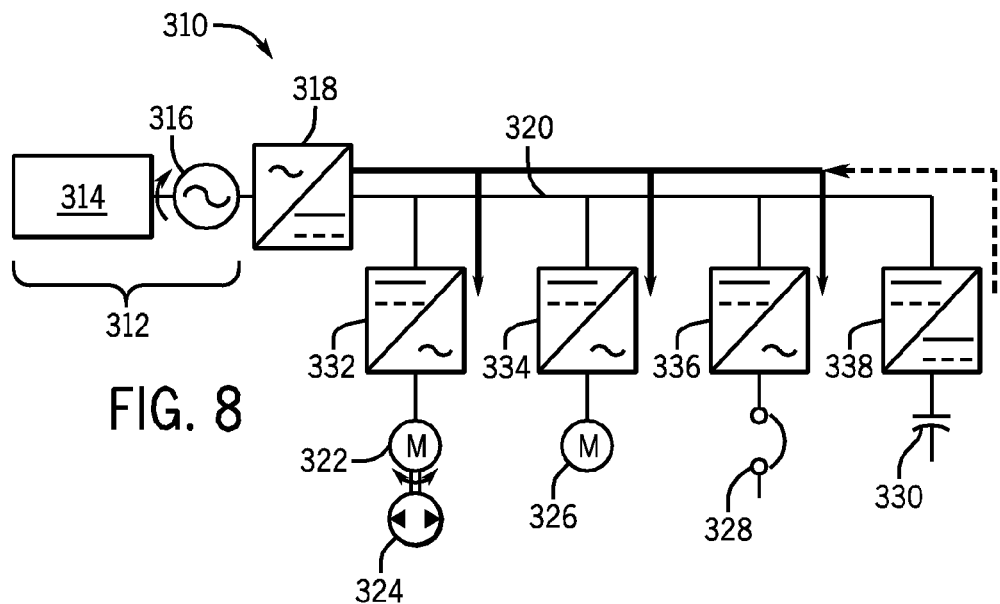
FIG. 8 is a schematic diagram of the energy management system of FIG. 7 in a second configuration.
Figure 9:
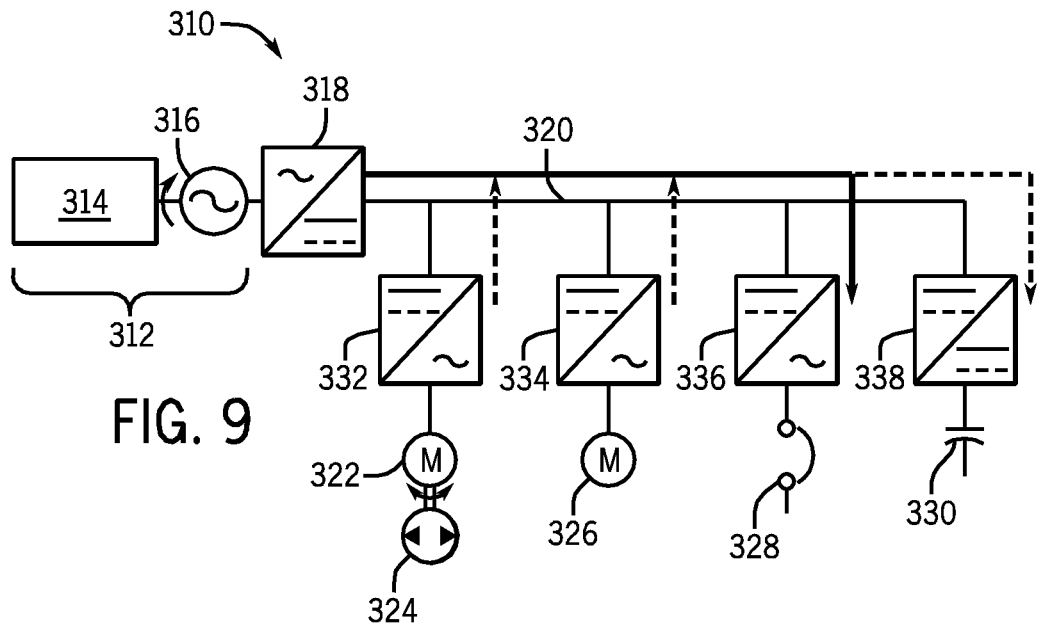
FIG. 9 is a schematic diagram of the energy management system of FIG. 8 in a third configuration.

Referring now to FIGS. 7-9, an energy management and storage system 310 includes a generator set 312 formed from an engine 314 (e.g., internal combustion engine, diesel engine) coupled to an alternator 316. When driven by the engine 314, the alternator 316 provides an electrical output that is converted from alternating current to direct current by a rectifier 318. The electrical output is then provided to a common electrical bus 320 that is in communication with working components of the system 310.

The working components include one or more electric motors 322 coupled to one or more hydraulic pumps 324, one or more additional electric motors 326, and/or auxiliary components 328. An energy storage component 330 (e.g., one or more capacitors) is also coupled to the electrical bus 320. In some embodiments, inverters 332, 334, 336 regulate the electricity to and from the electrical bus 320 to each of the working components. A state-of-charge controller 338 regulates the electricity to and from the electrical bus 320 to the energy storage component 330.

During operation of the system 310, electrical power is supplied from the generator set 312 to the electrical bus 320, and from the electrical bus 320 to the electric motors 322, 326 and auxiliary components 328. During lower-demand periods (e.g., portions of a work cycle) for the system 310 (see FIG. 7), some of the electricity of the electrical bus 320 is directed to the electrical storage component 330. During higher-demand periods (e.g., other portions of the work cycle) for the system 310 (see FIG. 8), power is drawn from the electrical storage component 330 to supplement power from the generator set 312, and is provided to the electric motors 322, 326 and/or auxiliary components 328.

According to an exemplary embodiment, the generator set 312 is run at a substantially constant speed, which produces electricity at a rate below the power required by the motors 322, 326 and auxiliary components 328 during the higher-demand periods. In some such embodiments, the generator set 312 is sized and configured such that the generator set 312 would be unable to satisfy the power requirements for the higher-demand periods (e.g., expected peak loads) without support from the energy storage component 330. So sizing and configuring the generator set 312 is intended to improve the efficiency of the system 310 by reducing the weight of the system 310 (i.e., having a smaller, lighter engine and alternator) and/or optimizing the fuel consumption of the generator set 312 by running the generator set 312 at an efficient speed and reducing production of surplus electricity.

In some embodiments, the system 310 further allows for regeneration of electricity from the electric motors 322, 326 (see FIG. 9). In a contemplated application, gravity acting upon a work implement (e.g., hydraulically actuated articulated arm with bucket) associated with the system 310 provides energy, which may be communicated to the electric motors 322 by way of hydraulic fluid driving the pump 324 coupled to the motors 322. In other contemplated applications, rotational or translational momentum may be recaptured by way of motors 326 coupled to the rotating or translating portions of the system 310 (e.g., slew motors coupled to the rotatable deck of a power shovel) in place of or in conjunction with friction braking. Regeneration of electricity is intended to improve the efficiency of the system and reduce the amount of heat absorbed by the hydraulic system.

Referring now to FIG. 10, by way of a graphical representation 410 of prophetic data produced from a simulation of an energy management and storage system for heavy equipment, relationships are illustrated between energy supplied by a generator set 412, energy held by a bank of ultra-capacitors 414, and energy demand 416 of the heavy equipment. According to the simulation, three work cycles are shown 418, 420, 422, each lasting for approximately thirty seconds (i.e., about 120 per hour).

The cycles 418, 420, 422 show a substantially repetitive oscillatory demand for energy, where the peak demands 424 exceed the substantially constant rate of electricity produced by the generator set 412 (e.g., by about 50%). When the energy demand 416 exceeds the production of the generator set 412, power is drawn from the ultra-capacitors, reducing the amount of energy stored by the ultra-capacitors 414. When the energy demand 416 drops below the level of energy production by the generator set 412, some of the power produced by the generator set is supplied to the ultra-capacitors, recharging the ultra-capacitors. Also during each cycle, the energy demand 416 drops below zero 426, indicating that energy may be regenerated during a portion of the simulated cycles 418, 420, 422.

Although shown with ultra-capacitors in FIG. 10, in other contemplated embodiments, an energy-storage system recaptures energy in one or more hydraulic accumulators, which would then be available as needed to supplement the generator set during peak demand periods. In other contemplated embodiments, a mechanical energy-storage system stores energy in rotating devices of rotational inertia, such as flywheels, or in potential energy of elevated weights. The stored energy would then be released as needed to supplement the main mechanical drives during periods of peak demand.

In other contemplated embodiments, various forms of both stationary and mobile heavy equipment include an energy management and storage system, as described above. The degree of repetitiveness of a work cycle for the heavy equipment may vary as a function of the particular form of heavy equipment and the particular operation or mission to be performed. In some embodiments (e.g., hydraulic drill), a cycle is repeated at a faster or slower rate than the example shown in FIG. 10. In some embodiments, the work cycle or pattern includes more than one peak or period in which energy from an energy storage component supplements an associated generator set.

While much of the above disclosure focuses on heavy equipment (e.g., power shovel, forklift) and operation thereof during a substantially repetitive work cycle, such heavy equipment may also operate outside of the substantially repetitive work cycle, such as when the heavy equipment is initially starting an operation or when the heavy equipment is moving to a new worksite. In other embodiments, heavy equipment benefiting from teachings disclosed herein may not be particularly designed to operate in a substantially repetitive work cycle (e.g., bulldozer, tractor, hauling vehicles for underground mining).

Figure 11:
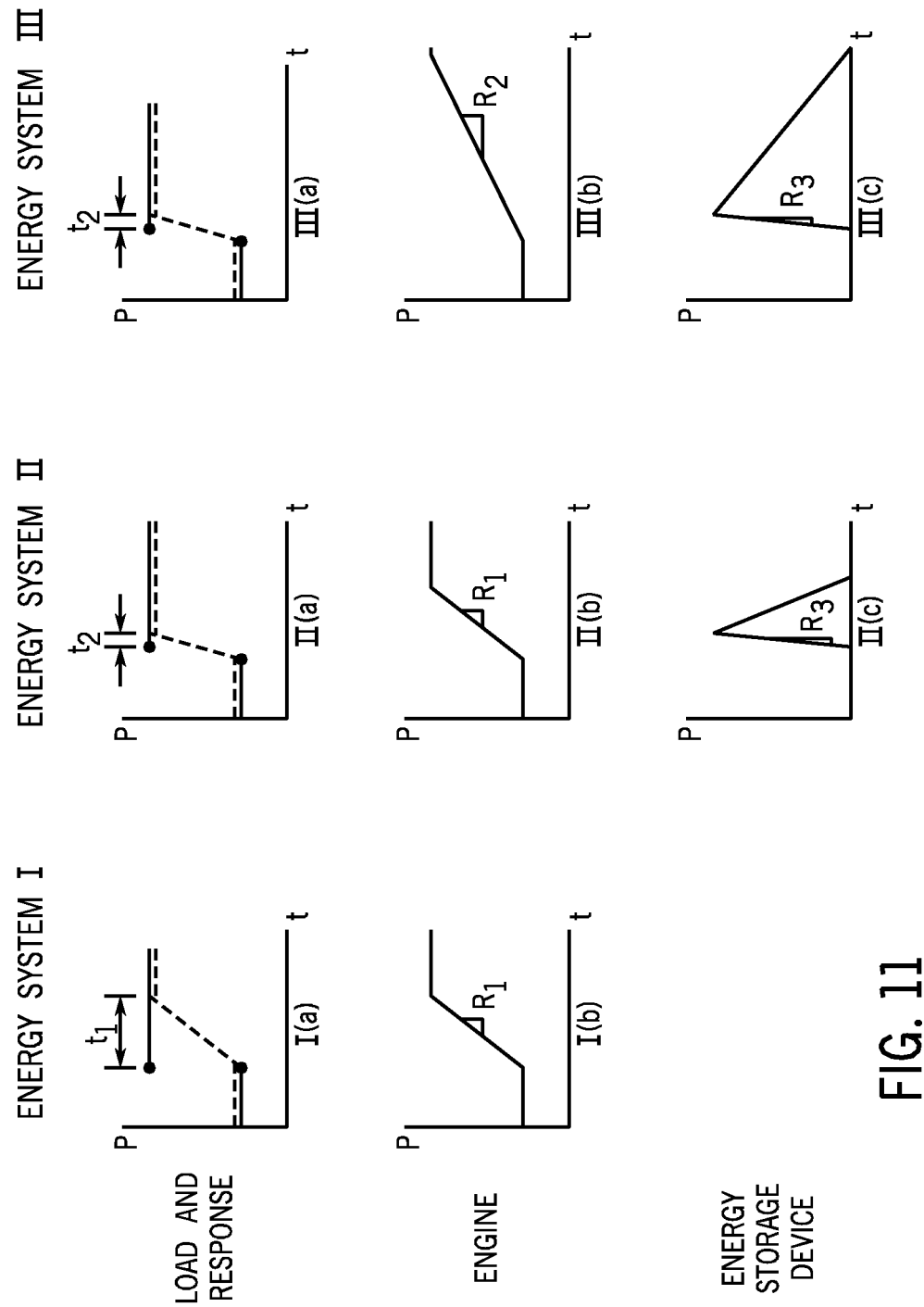
FIG. 11 is a series of graphical representations of features of hypothetical energy systems operating in response to a change in load according to an exemplary embodiment.

Generally referring to FIG. 11 in view of the above disclosure, a series of graphical representations provide hypothetical short-term response profiles of features of three different energy systems I, II, III of heavy equipment (e.g., system 310 as shown in FIG. 7 and features of power shovel 110 as shown in FIGS. 1-5) responding to a change in load. Each energy system includes an engine (e.g., engine 314 as shown in FIG. 7 and engine 156 as shown in FIG. 4) that drives a generator (e.g., engine 314 as shown in FIG. 7 and engine 156 as shown in FIG. 4) for providing power to an electrical bus (e.g., bus 320 as shown in FIG. 7 and components associated with electronic compartment 118 as shown in FIGS. 1-2).

According to an exemplary embodiment, electrical drives (e.g., inverters 332, 334, 336, 338 as shown in FIG. 7 and electrical drive system 172 as shown in FIG. 2) and are coupled to the bus to control delivery of power to one or more actuators, such as electric motors (e.g., motors 322, 326, 328, 330 as shown in FIG. 7 and motors 164 as shown in FIG. 5) or other actuators (e.g., solenoids).

In energy systems II and III the bus is further configured to provide energy to and receive energy from an energy storage device (e.g., system, group of energy storage components), such as an ultra-capacitor (e.g., ultra-capacitor bank(s); energy storage component 330 as shown in FIG. 7 and ultra-capacitors 150 as shown in FIGS. 2-3) controlled by a drive in the form of a state-of-charge controller (e.g., inverter 338 as shown in FIG. 9).

Referring to the energy system I in FIG. 11, graphical representation I(a) shows the power demand on the bus (solid line) and the net power output of the energy system I (dashed line) during a rapid increase in the demand (, discrete increase between points on solid line). Graphical representation I(b) shows the power output of an engine of the energy system I during the corresponding time. In the energy system I, the generator driven by the engine is the only source of electrical power for the bus.

Still referring to the energy system I in FIG. 11, as demand upon the electrical bus rapidly increases and the change in voltage on the bus is sensed. A controller throttles the engine to increase the work output of the engine. The engine then responds to the increased demand by increasing the power output of the engine at a rate $R_1$ (second derivative of work output with respect to time; derivative of power output with respect to time; joules per second squared), which may correspond to a maximum capability of the engine to increase the power output.

For the energy system I in FIG. 11, the increased demand on the bus is met by the engine after a duration of time $t_1$. In the hypothetical scenario, the rate $R_1$ of output power increase of the engine corresponds to an inefficiently fast throttling of the engine intended to increase the power output of the engine as quickly as possible to compensate for the change in voltage on the bus. However, the rate $R_1$ results in reduced fuel economy and increased hydrocarbon emissions during the throttling.

Referring to the energy system II in FIG. 11, graphical representation II(a) shows the power demand and net response of the energy system II during a rapid increase in demand identical to the rapid increase in demand of graphical representation I(a). Graphical representation II(b) shows power output of an engine during the corresponding time, which is also identical to the corresponding graphical representation I(b) of the energy system I. Unlike the energy system I, the energy system II includes an energy storage element, and graphical representation II(c) shows the power output of an energy storage device during the corresponding time.

According to an exemplary embodiment, the energy storage device shown in graphical representation II(c) is capable of a significantly faster response rate $R_3$ to the increased demand on the bus than the rate $R_1$ of the engine (coupled to a generator). Accordingly, as the engine is ramping up to meet the increased demand, the energy storage device serves to supply the power difference between the demand and engine power output. As a result, the time $t_2$ for the net power output of the energy system II to respond to the demand is less than the time $t_1$ required by the hypothetical energy system I. However, the engine of energy system II, like the engine of energy system I, still responds to the change in demand at the inefficient rate $R_1$.

Figure 12:
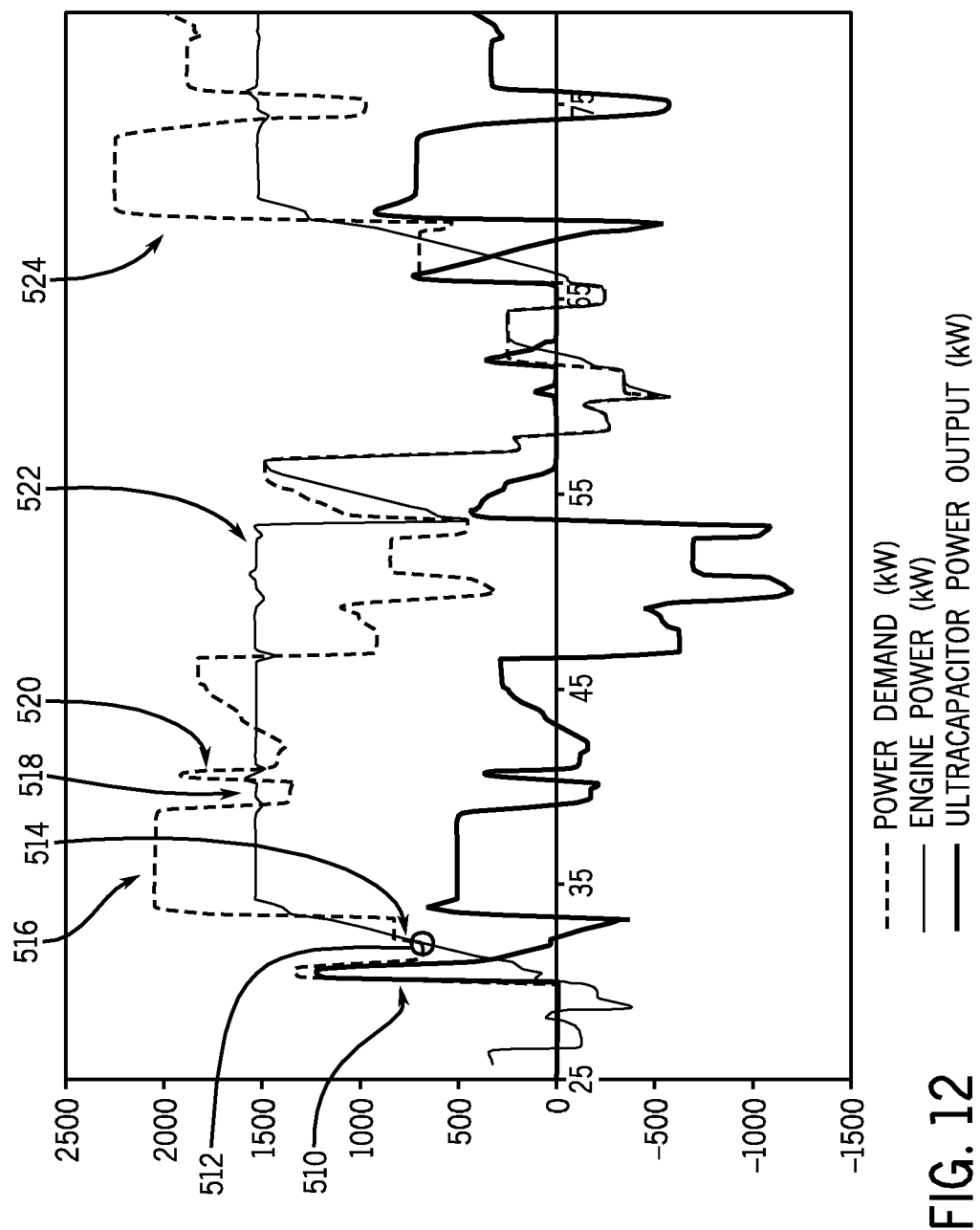
FIG. 12 is a graphical representation of prophetic data provided by a simulation according to another exemplary embodiment.

In some embodiments, the engine of energy system II (and of energy system III) is sized to an average load of the system (e.g., designed for horsepower output corresponding to an average load of the system), as opposed to being sized to optimally meet expected peak loads. The energy storage device may be used to provide the additional power required during periods of peak demands so that the engine need not operate outside of a range corresponding to improved efficiency of the engine (see, e.g., peak loading 516, 524 as shown in FIG. 12 where engine ramps to level below power demand). In contemplated embodiments, the engine may be incapable of meeting expected peak loads of the system without support from the energy storage device.

In some contemplated embodiments, the engine may be sized below the average demand (e.g., expected load) of a cycle. Also, depending upon the specific operation of the heavy equipment, the engine may be sized above the average load per cycle, such as if the material being moved is relatively light. In at least one contemplated embodiment, a controller may use the engine to charge the energy storage device during a transition period between work cycles, such as during a break of the operator or movement of the heavy equipment to a new worksite. Energy stored during the transition period may then be used to supplement the engine during a substantially repetitive cyclical portion of the operation, allowing the engine to be designed for an optimal output that is less than the average expected demand during the substantially repetitive cyclical portion of the operation. In still other embodiments the heavy equipment is not designed to operate in a substantially repetitive work cycle.

Referring to the energy system III in FIG. 11, graphical representation III(a) shows the power demand and net response of the energy system III during a rapid increase in demand. The rapid increase in demand is identical to the rapid increase in demand of graphical representations I(a) and II(a), and the net response is identical to the response in graphical representation II(a). Graphical representation III(b) shows power output of an engine during the corresponding time and graphical representation III(c) shows the power output of an energy storage device during the corresponding time.

According to an exemplary embodiment, the engine in graphical representation III(b) is restrained (e.g., governed, damped) from responding at full capacity to the change in demand shown in graphical representation III(a). Instead, the response rate $R_2$ of the engine is less than the response rate $R_1$ in graphical representations I(b) and II(b) corresponding to energy systems I and II. The energy storage device shown in graphical representation III(c) compensates for the slower ramping of the engine by providing power for a longer duration (and a greater quantity of electrical energy) than the energy storage device of graphical representation II(c). Because of the greater power output provided by the energy storage device, an ultra-capacitor or another energy storage device with a relatively large energy capacity and rapid response capability may be better suited as the energy storage device than other devices in some embodiments.

In the hypothetical scenario, the net response of the energy system III matches that of energy system II and both are an improvement over the responsiveness of energy system I because time $t_2$ is less than time $t_1$. However the controller of the energy system III delegates individual contributions to the net response between the engine and energy storage device differently than the energy system II by relying a greater amount on the power output of the energy storage device and allowing the engine to ramp at the slower rate $R_2$. The net short-term dynamic response of the energy system III to the change in demand on the bus shown in graphical representation III(a) is substantially unaffected by the rate of change in power output of the engine shown in graphical representation III(b).

According to an exemplary embodiment, despite being capable of a faster, less-damped response, a controller (, control computer 170, electronic control unit for engine 156 as shown in FIG. 2) actively prevents the engine from responding inefficiently, instead relying upon the energy storage device for a short-term source of power for the bus (or sink for excess power). In some embodiments, a throttle of the engine may be restrained by the controller to provide a work output of the engine at operating speeds, torques, loads, etc. associated with efficient fuel consumption, reduced component wear, reduced emissions, or other parameters.

In some embodiments, the slower rate $R_2$ is optimized for fuel economy. When operating at the rate $R_2$, the engine more efficiently and completely burns fuel during combustion. Less hydrocarbons are produced. In other embodiments, the slower rate is optimized to minimize wear on the engine or other parts of the heavy equipment (e.g., cooling system), reduce pollution, reduce noise, minimize the workload on the engine, or other factors. In still other embodiments, the rate $R_2$ of the change in power output of the engine is optimized for a combination of such factors, such as both fuel economy and minimal wear on the engine.

The energy system III may operate in a similar manner during a rapid reduction in demand upon the electrical bus. For example, the engine may be controlled to ramp down the power output thereof at a rate less than the capability of the engine to ramp down. The rate that the engine decreases power output may be optimized for fuel efficiency, minimal engine wear, or other factors. As the engine is ramping down, excess power from the bus provided by the engine may be received and stored by the energy storage device.

Referring now to FIG. 12, a graphical representation includes prophetic information from a computer simulation corresponding to operation of a energy system for heavy equipment. The energy system includes an electrical bus, an engine driving a generator, and an ultra-capacitor. According to an exemplary embodiment, the energy system is configured to operate in a substantially repetitive cycle where the power output of the engine changes during the cycle (as opposed to some of the above-described embodiments). In some such embodiments, the power output of the engine is controlled to change smoothly and efficiently while the energy storage device reacts to the short-term fluctuations in power demand on the bus.

During a first event 510 in the simulation, the power demand for the energy system rapidly increases. Power output from the ultra-capacitor is used to charge the bus to meet the demand and the power output of the engine gradually increases to meet the demand. The gradual increase in power output may correspond to a rate optimized for fuel economy. As the power output of the engine increases, the power provided by the ultra-capacitor correspondingly decreases.

During a second event 512 in the simulation, the engine provides sufficient power output to meet the demand and the ultra-capacitor is charged by electrical power communicated thereto by the bus.

During a third event 514 in the simulation, the power demand on the bus increases at a rate that the engine is capable of efficiently meeting, and power from the ultra-capacitor is not used. However, during the third event 514, power is no longer supplied from the bus to charge the ultra-capacitor (or the amount of power is reduced) and priority for the available power on the bus is to meet the increased demand by an actuator operating a tool of the heavy equipment.

During a fourth event 516 in the simulation, peak demand on the bus occurs. Power from the ultra-capacitor is used to supplement the power from the engine. The power output of the engine gradually increases to a predetermined level. The predetermined level may correspond to a maximum output of the engine, the upper bound of a range of fuel efficient operation of the engine, an upper bound of operation of the engine at minimal wear to the engine, or another threshold. However, in the simulation, the predetermined level of power output from the engine is less than the demand and the remaining differential is met by the ultra-capacitor. In some such embodiments, the engine selected for the heavy equipment is intentionally sized so as to not provide the full power during the peak loading of the heavy equipment, with the expectation that the ultra-capacitor will supplement the engine to meet the peak demand. Such an engine may be lighter, more responsive, use less materials, etc. than an engine with a higher load capacity.

During a fifth event 518 in the simulation, the power demand on the bus decreases to about the predetermined level for the engine. Notably, the output of the ultra-capacitor is reduced before the power output of the engine is reduced. Changing power output of the ultra-capacitor before changing the power output of the engine may be more efficient because the engine may have greater energy losses associated with transitioning to a different power output levels than the ultra-capacitor. Furthermore, excess power from the engine may be used to recharge the ultra-capacitor.

During a sixth event 520 in the simulation, demand on the bus again exceeds the predetermined level for the power output of the engine, and the ultra-capacitor is again used to supplement the power output of the engine. However, the sixth event does not represent the peak demand on the bus during the cycle shown in FIG. 12.

During a seventh event 522 in the simulation, the power demand on the bus decreases below the predetermined level for the engine. Some power from the bus is used to charge the ultra-capacitor. If the decrease in demand exceeds the ability of the engine to efficiently decrease power output, then the ultra-capacitor may be used to receive excess power provided by the engine, allowing the engine to ramp down to a lower power output at in an efficient manner. In some embodiments, the cycle then substantially repeats, with a similar peak demand 524 an other such events. In other embodiments, the energy system operates in heavy equipment that is not designed or intended to operate in a substantially repetitive work cycle.

Figure 13:
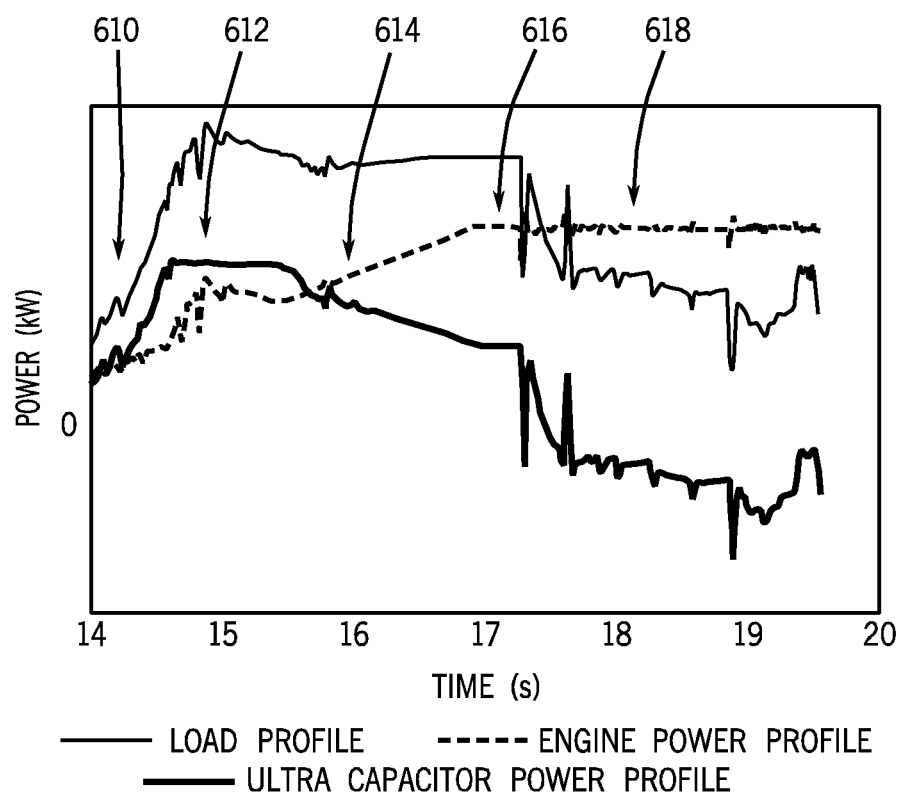
FIG. 13 is a graphical representation of prophetic data provided by a simulation according to another exemplary embodiment.

Referring to FIG. 13, a graphical representation includes prophetic information from a computer simulation corresponding to operation of an energy system for heavy equipment. The energy system includes an engine driving a generator and an ultra-capacitor. Both the engine and ultra-capacitor in the simulation are coupled an electrical bus configured to supply power to an actuator configured to operate a tool of the heavy equipment.

During a first event 610 in the simulation, the simulated load profile of the heavy equipment rapidly increases. In response, the power output of both the ultra-capacitor and engine increase. However, the power output of the ultra-capacitor increases more rapidly than the engine. During the first event 610, the power output of the ultra-capacitor fully compensates for the difference in power output between the engine and the load profile. The rate of power increase of the engine may correspond to a rate optimized for fuel efficiency.

During a second event 612 in the simulation, the power output of the ultra-capacitor has reached a predetermined level, which may correspond to a maximum output of the ultra-capacitor, a maximum output corresponding to a particular operation of the heavy equipment, or another threshold. In some embodiments, the ultra-capacitors may be saturated and cannot provide additional power output. To meet the increased load demand during the second event 612, the engine temporarily increases the rate of change in power output above an optimal rate.

During a third event 614 in the simulation, the demand is met between the net output of the engine and ultra-capacitor. The engine returns to the rate optimized for fuel efficiency. The power output of the ultra-capacitor decreases at a rate corresponding to the increase in power output of the engine.

During a fourth event 616 in the simulation, the engine reaches a predetermined level. With the demand on the bus held constant, the power outputs of the engine and ultra-capacitor remain constant.

During a fifth event 618 in the simulation, the load profile of the electric bus decreases below the power output of the engine. Excess power on the bus is used to charge the ultra-capacitor. Once the ultra-capacitor is charged above a predetermined threshold, the controller may decrease the power output of the engine to an average level of loading, or to another level.

Figure 14:
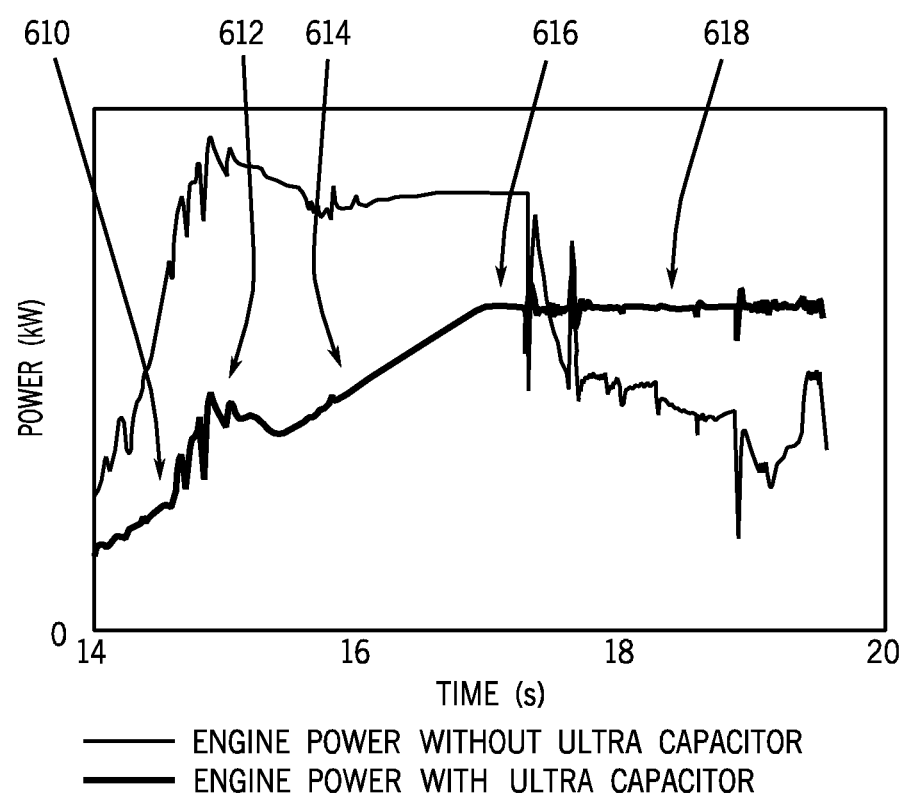
FIG. 14 is a graphical representation comparing prophetic data provided by the simulation of FIG. 13 and another simulation.

Referring to FIG. 14, a graphical representation presents a hypothetical comparison between the engine of the system shown in FIG. 13 and an energy system that does not include an energy storage device (see generally energy system I as shown in FIG. 11). Through the use of the energy storage device, the energy system of FIG. 13 operates the engine at a more efficient rate of power increase during the third event 614.

According to an exemplary embodiment, the energy systems shown in FIGS. 11-14 allow for smooth increases and decreases in the power output of the engine. Providing smooth transitions (e.g., ramping up or down of power output) on the engine and correspondingly preventing fast, dynamic load changes may improve fuel efficiency and reduce pollution caused by the engine, especially for heavy equipment that continuously operates with rapid changes in energy demands. Furthermore, providing smooth transitions may extend the life of the engine by reducing dynamic stress on the engine.

The construction and arrangements of the energy system for heavy equipment, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. An energy system for heavy equipment having an actuator for operating a tool, the energy system comprising:
    a bus for providing electricity to the actuator as a function of operation of the tool;
    an engine for providing a power output;
    a generator coupled to the engine and configured to provide electricity to the bus;

an energy storage device configured to receive electricity from the bus for storage of energy, and further configured to provide electricity to the bus to supplement the electricity provided by the generator; and a controller configured to change the power output of the engine as a function of electrical demand on the bus, wherein, in response to a change in the electrical demand, the controller is configured to change the power output of the engine at a rate that is less than a maximum capability of the engine, and wherein the controller is configured to optimize the rate of change in power output of the engine with respect to fuel economy, minimal wear, reduced emissions, or a combination thereof.

2. The energy system of claim 1, wherein the energy storage device is configured such that a net short-term dynamic response of the energy system to the change in demand on the bus is substantially unaffected by the rate of change in power output of the engine.

3. The energy system of claim 2, wherein when the demand on the bus increases, the controller is configured to restrain a throttle of the engine such that the power output of the engine increases at the rate that is less than the maximum capability of the engine.

4. The energy system of claim 3, wherein the energy storage device is configured to provide increased electrical power in response to an increase in the demand on the bus at a rate that is faster than the engine is capable of providing to the bus via the generator.

5. The energy system of claim 4, wherein the energy storage device comprises an ultra-capacitor and the engine and generator are parts of a diesel generator set.

6. The energy system of claim 1, wherein the controller is configured to optimize the rate of change in power output of the engine with respect to fuel economy.

7. The energy system of claim 1, wherein the controller is configured to optimize the rate of change in power output of the engine with respect to both fuel economy and minimal wear to the engine.

8. The energy system of claim 1, wherein the energy system is designed for use with the heavy equipment operating in a substantially repetitive work cycle, and wherein the engine is designed to operate with an optimal power output that corresponds to or is less than an average demand on the bus during the substantially repetitive work cycle.

9. The energy system of claim 8, wherein the engine is not designed to efficiently meet a peak demand of the substantially repetitive work cycle.

10. An energy system for heavy equipment having an actuator for operating a tool, the energy system comprising:
a bus for providing electricity to the actuator as a function of operation of the tool;
an engine for providing a power output;
a generator coupled to the engine and configured to provide electricity to the bus;
an ultra-capacitor configured to receive electricity from the bus for storage of energy, and further configured to provide electricity to the bus to supplement the electricity provided by the generator; and
a controller configured to change the power output of the engine as a function of electrical demand on the bus,
wherein, in response to a change in the electrical demand, the controller is configured to optimize the rate of change in power output of the engine with respect to fuel economy.

11. The energy system of claim 10, wherein the ultra-capacitor is configured such that a net short-term dynamic response of the energy system to the change in demand on the bus is substantially unaffected by the rate of change in power output of the engine.

12. The energy system of claim 10, wherein the energy system is designed for use with the heavy equipment operating in a substantially repetitive work cycle, and wherein the engine is designed to operate with an optimal power output that corresponds to or is less than an average demand on the bus during the substantially repetitive work cycle.

13. The energy system of claim 12, wherein the engine is not designed to efficiently meet a peak demand of the substantially repetitive work cycle.

14. A method of controlling an energy system for heavy equipment, comprising:
providing electrical power to a bus from a generator driven by an engine for powering an actuator operating a tool of the heavy equipment;
providing electrical power to the bus from an energy storage device in response to an increased electrical demand on the bus; and
increasing the power output of the engine driving the generator at a rate less than a maximum capability of the engine, and correspondingly decreasing the power provided to the bus from the energy storage device.

15. The method of claim 14, wherein the energy storage device provides electrical power to the bus such that a net short-term dynamic response of the energy system to the increase in demand on the bus is substantially unaffected by the rate of increase in power output of the engine.

16. The method of claim 15, further comprising charging the energy storage device with electrical power provided by the bus.

17. The method of claim 16, wherein the rate of change in power output of the engine is optimized with respect to fuel economy, minimal wear, reduced emissions, or a combination thereof.

18. The method of claim 17, wherein the rate of change in power output of the engine is optimized with respect to fuel economy.

19. The method of claim 18, wherein the energy storage device comprises an ultra-capacitor and the engine and the generator are parts of a diesel generator set.

20. An energy system for heavy equipment having an actuator for operating a tool, the energy system comprising:
a bus for providing electricity to the actuator as a function of operation of the tool;
an engine for providing a power output;
a generator coupled to the engine and configured to provide electricity to the bus;
an energy storage device configured to receive electricity from the bus for storage of energy, and further configured to provide electricity to the bus to supplement the electricity provided by the generator; and
a controller configured to change the power output of the engine as a function of electrical demand on the bus,
wherein, in response to a change in the electrical demand, the controller is configured to change the power output of the engine at a rate that is less than a maximum capability of the engine, and
wherein the energy system is designed for use with the heavy equipment operating in a substantially repetitive work cycle, and wherein the engine is designed to operate with an optimal power output that corresponds to or is less than an average demand on the bus during the substantially repetitive work cycle.

21. The energy system of claim 20, wherein the energy storage device is configured such that a net short-term dynamic response of the energy system to the change in demand on the bus is substantially unaffected by the rate of change in power output of the engine.

22. The energy system of claim 21, wherein when the demand on the bus increases, the controller is configured to restrain a throttle of the engine such that the power output of the engine increases at the rate that is less than the maximum capability of the engine.

23. The energy system of claim 22, wherein the energy storage device is configured to provide increased electrical power in response to an increase in the demand on the bus at a rate that is faster than the engine is capable of providing to the bus via the generator.

24. The energy system of claim 23, wherein the energy storage device comprises an ultra-capacitor and the engine and generator are parts of a diesel generator set.

25. The energy system of claim 20, wherein the controller is configured to optimize the rate of change in power output of the engine with respect to fuel economy.

26. The energy system of claim 25, wherein the controller is configured to optimize the rate of change in power output of the engine with respect to both fuel economy and minimal wear to the engine.

27. The energy system of claim 20, wherein the engine is not designed to efficiently meet a peak demand of the substantially repetitive work cycle.

* * * * *